S. HEATH.
BREAD TOASTER.
APPLICATION FILED OCT. 6, 1919.

1,397,959.

Patented Nov. 22, 1921.

Inventor
Samuel Heath
By W. W. Williamson
Atty.

UNITED STATES PATENT OFFICE.

SAMUEL HEATH, OF PHILADELPHIA, PENNSYLVANIA.

BREAD-TOASTER.

1,397,959. Specification of Letters Patent. Patented Nov. 22, 1921.

Application filed October 6, 1919. Serial No. 328,625.

*To all whom it may concern:*

Be it known that I, SAMUEL HEATH, a citizen of the United States, residing at Philadelphia, in the county of Philadelphia and State of Pennsylvania, have invented new and useful Improvements in Bread-Toasters, of which the following is a specification.

My invention relates to a new and useful improvement in bread toasters, and has for its object to provide an exceedingly simple and effective device of this description which will provide for directing the heat from a gas or electric source in the most effective manner upon the surface of the bread being toasted.

A further object of the invention is to provide clips for holding the bread while being toasted in the proper position relative to the source of heat, said clips being of such construction as to readily permit the insertion or removal of the bread, and A still further object of the invention is to provide for the even distribution of heat to the surface of the bread being toasted.

With these ends in view, this invention consists in the details of construction and combination of elements hereinafter set forth and then specifically designated by the claim.

In order that those skilled in the art to which this invention appertains, may understand how to make and use the same, I will describe its construction in detail, referring by numerals to the accompanying drawing forming a part of this application, in which:—

Figure 1:
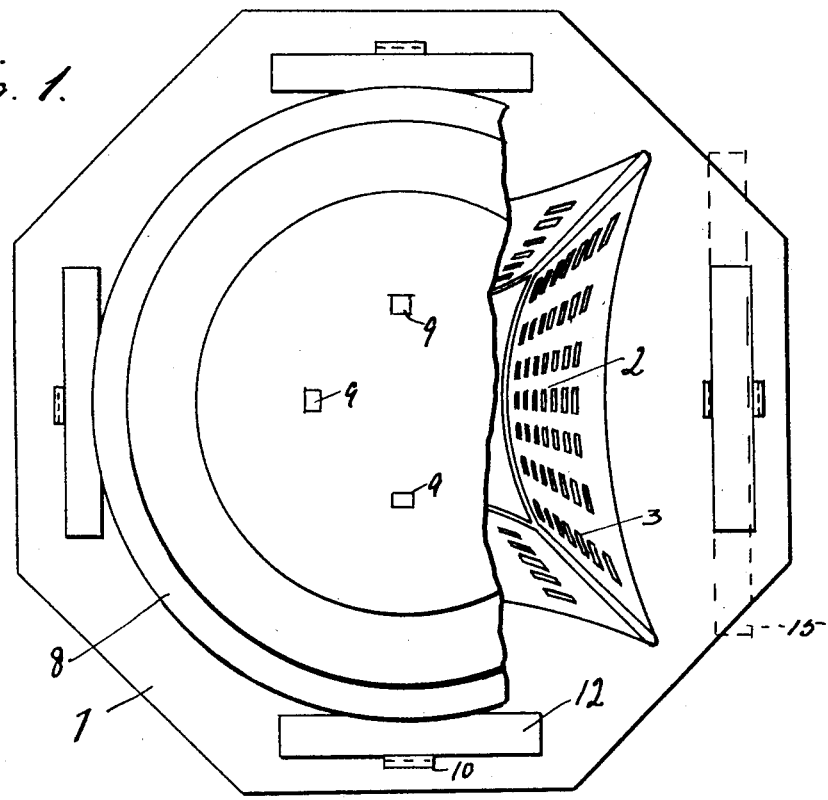
Figure 2:
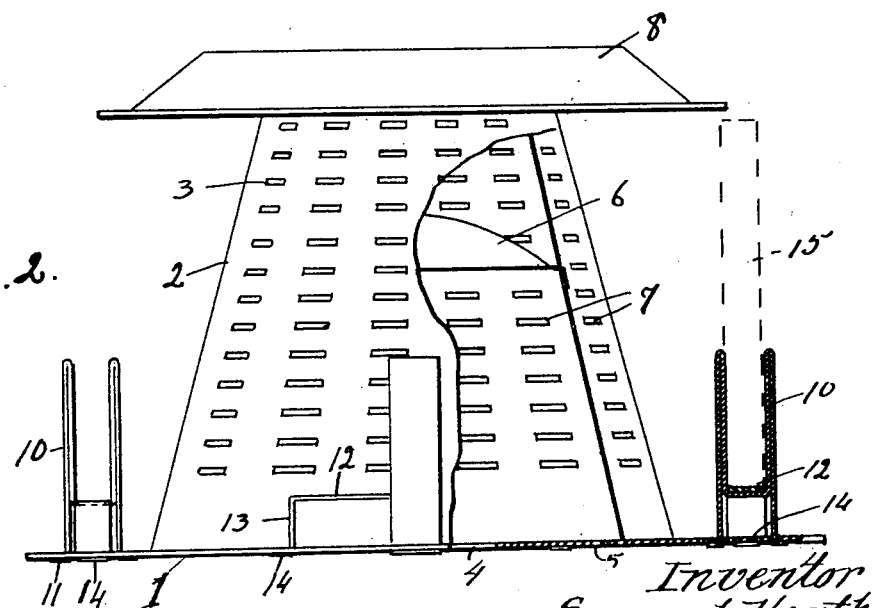

Figure 1, is a plan view of my improved toaster a portion of the deflector being broken away so as to clearly show the construction of the body, and Fig. 2, is a side elevation, a portion of the body being broken away to show the baffle disk within the body.

In carrying out my invention as here embodied, 1 represents a base plate which may be of any desired shape here shown as octagonal, and 2 is the body of the toaster which is secured upon the base plate the side walls of which gradually taper inward toward the top and while this body may be round in cross section or any other desired shape, I prefer to have it square in cross section with the sides thereof bowed inward as clearly shown in Fig. 1 for the purpose hereinafter set forth. These side walls are perforated or slotted as indicated at 3.

Through the center of the base plate is formed an opening 4 around which are a series of holes 5 for the passage of heat from a gas stove or other source into the body of the device, and the upward flow of this heat is retarded by the baffle disk 6 which is secured within the body, thus tending to throw a large percentage of the heat outward through the perforations 7 below the baffle disk, while the heat which escapes around the edges of the baffle disk and passes upward within the body will gradually escape through the perforations 7 above the baffle disk and deflected downward and outward at an angle by reason of the inverted saucer shape of the deflector 8 which latter is secured upon the top of the body by the prongs 9.

10 represents the clips for holding the bread or other articles to be toasted each consisting of a strip of metal so bent as to form a U shaped holder and then bent upon itself and extending downward through the base and held in place by the outturned ends 11. Coacting with each of these clips is a support 12 which extends between the prongs of the holder and having the legs 13 which extend downward passing through the base where they are secured by the outturned ends 14. By this construction of the holding clips and their coacting supports a slice of bread may be placed within the clip and there supported in the proper relative position to the body of the device to properly effect the toasting thereof.

The dotted lines 15 represent the relative position of a slice of bread when held by one of the clips and from this it will be seen that the heat issuing through the perforations 7 will have a tendency to flow outward and contact with the inner surface of the slice of bread while that portion of the heat which rises beneath the saucer shaped deflector 8 will be deflected downward and outward so as to contact with the upper portion of the bread, thus thoroughly effecting the object aimed at.

Further efficiency is effected in the toasting operation from the fact that the side walls of the body are concaved so that heat issuing from the perforations 7 will have a tendency to be housed between the side walls and the slices of bread whereby the partial confining of the heat will more evenly toast the exposed surface.

Of course I do not wish to be limited to the exact details of construction as herein shown as these may be varied within the limits of the appended claim without departing from the spirit of my invention.

Having thus fully described my invention, what I claim as new and useful is:—

In combination with a toaster including a base, a plurality of clips each comprising a U-shaped holder having sections bent upon itself and projecting downward below the holder and attached to the base and supports coacting with the clips, said supports extending between the walls of the clips and having legs for attachment to the base, and a frusto-pyramidal body spaced from said clips and having a plurality of concaved surfaces, one of said surfaces being disposed opposite each of said clips.

In testimony whereof I have hereunto affixed my signature.

SAMUEL HEATH.